United States Patent [19]

Alsmarraie et al.

[11] Patent Number: 5,106,908
[45] Date of Patent: Apr. 21, 1992

[54] POLYORGANOSILOXANE/POLYVINYL-BASED GRAFT (METH)ACRYLATE POLYMERS

[75] Inventors: Muhanad A. Alsmarraie, Clifton Park; Stanley Y. Hobbs, Scotia, both of N.Y.; I-chung W. Wang, Williamstown, Mass.; Vicki H. Watkins, Alplaus, N.Y.

[73] Assignee: General Electric Company, Pittsfield, Mass.

[21] Appl. No.: 271,248

[22] Filed: Nov. 14, 1988

[51] Int. Cl.⁵ ............................................ C08F 257/02
[52] U.S. Cl. .................................... 525/105; 525/100; 525/104; 525/179
[58] Field of Search ............... 525/100, 104, 105, 475, 525/474, 63

[56] References Cited

U.S. PATENT DOCUMENTS

| | | |
|---|---|---|
| 4,226,761 | 10/1980 | Cooper et al. .......................... 525/63 |
| 4,564,653 | 1/1986 | Kamata et al. .......................... 525/67 |
| 4,812,515 | 3/1989 | Kress et al. ............................. 525/69 |

FOREIGN PATENT DOCUMENTS

| | | | |
|---|---|---|---|
| 0051471 | 5/1982 | European Pat. Off. .............. 525/66 |
| 0217257 | 4/1987 | European Pat. Off. ............. 525/479 |
| 0231776 | 8/1987 | European Pat. Off. .............. 525/63 |

Primary Examiner—Melvyn I. Marquis
Assistant Examiner—R. Dean, Jr.
Attorney, Agent, or Firm—Hedman, Gibson, Costigan & Hoare

[57] ABSTRACT

A multi-stage polyorganosiloxane/polyvinyl-based graft polymer is provided by the co-homopolymerization of organosiloxanes and a vinyl-based monomer (e.g. styrene) and the subsequent graft polymerization of one or more stages of additional (meth)acrylate monomers, vinyl aromatic/(meth)acrylate comonomers or vinyl aromatic/vinyl cyanide/(meth)acrylate termonomers with or without an intermediary stage comprising a polymer.

15 Claims, 3 Drawing Sheets

POLYORGANOSILOXANE/POLYVINYL-BASED GRAFT (METH)ACRYLATE POLYMERS

CROSS-REFERENCE TO RELATED APPLICATIONS

This application is related to the following commonly owned, concurrently-filed U.S. patent applications:

| SERIAL NO. | SUBJECT MATTER | APPLICANT(S) |
|---|---|---|
| 07/271,250 | Polyorganosiloxane/ polyvinyl-based Graft Polymers, Process and Thermoplastic Compositions Containing the Same | I-C. W. Wang |
| 07/271,223 now U.S. Pat. No. 4,939,205 | Thermoplastic Molding Compositions Containing Polyorganosiloxane/ polyvinyl-based Graft Polymer Modifiers | J. L. DeRudder F. J. Traver I-C. W. Wang |
| 07/271,222 now U.S. Pat. No. 4,927,880 | Low Gloss Molded Articles Using Polyorganosiloxane/ polyvinyl-based Graft Polymers | J. L. DeRudder H. Savenije I-C. W. Wang |
| 07/271,249 | Polyphenylene ether or Polyphenylene ether/Polystyrene with Polyorganosiloxane/polyvinyl-based Graft Polymer Modifiers | M. A. Alsamarraie W. R. Haaf W. J. Peascoe I-C. W. Wang |
| 07/271,247 | Polyester, Polycarbonate and/or Polyphenylene ether with Polyorganosiloxane/ polyvinyl-based Graft (meth)-acrylate Polymers | M. A. Alsamarraie S. Y. Hobbs I-C. W. Wang V. H. Watkins |
| 07/271,230 now U.S. Pat. No. 4,939,206 | Flame Retardant Polyorganosiloxane-based Graft Polymers | I-C. W. Wang |
| 07/271,246 | Polycarbonate and Polyester Blends Modified with Polyorganosiloxane Graft Polymers Combined with Diene Rubber-based Graft Polymers | J. L. DeRudder I-C. W. Wang |
| 07/271,896 now U.S. Pat. No. 4,968,746 | Polyesters Modified with Polyorganosiloxane/polyvinyl-based Graft Polymers | J. L. DeRudder I-C. W. Wang |

FIELD OF THE INVENTION

The invention relates to polyorganosiloxane/polyvinyl-based graft polymers. Novel polyorganosiloxane/-polyvinyl-based modifiers are provided comprising a polyorganosiloxane/polyvinyl first stage and one or more grafted or molecularly interlocked subsequent stages comprising a (meth)acrylate polymer, a vinyl aromatic/(meth)acrylate copolymer or a vinyl aromatic/vinyl cyanide/(meth)acrylate terpolymer with or without an intermediary stage comprising a polymer.

BACKGROUND OF THE INVENTION

A novel polyorganosiloxane/polyvinyl-based graft polymer has been discovered which is extremely useful as a modifier for various thermoplastic resins while maintaining many unique features of silicone rubber.

It shows good blend morphology, good rubber dispersion and no tendency to agglomerate, all as shown by transmission electron microscopy (TEM), while imparting good impact strength and ductility at a wide range of temperatures with no tendency to cause delamination and surface mottling to articles molded from thermoplastic resin blends containing this modifier.

There have been many attempts in the art to provide polyorganosiloxane-based graft polymers which may be useful as impact strength modifiers for thermoplastic resins. See for example, U.S. Pat. Nos. 2,891,920 (J. F. Hyde, et al.); and O. Graiver, et al., Rubber Chem. Tech., 56 (5), 918 (1983).

The major deficiencies which have prevented the widespread use of polyorganosiloxane impact modifiers in thermoplastic resins have included raw material costs, relatively poor rubber integrity, and the incompatibility of the silicone-based rubber modifier and the thermoplastic resin. Additionally, the siloxane polymerization process requires careful control to eliminate contamination of the silicone rubber by linear or cyclic siloxane oligomers. Surface delamination in molded thermoplastic parts has been partially attributed to the presence of such oligomer contaminants in the silicone rubber.

Polycarbonate resin compositions and blends of polycarbonate resins with other thermoplastic resins are widely used because of their excellent properties. Polycarbonate resin compositions and mixtures thereof with a saturated polyester and/or a poly(etherester) elastomer with a polyorganosiloxane-based impact modifier are described, for example, in European Patent Application No. 0,249,964. It is disclosed therein that very desirable improvements in chemical resistance, weather resistance and low temperature impact resistance are achieved if an additive comprising a silicone-based graft polymer is used.

Polyphenylene ether resin compositions alone or in blends with other resins are also widely used because of their excellent properties. Polyphenylene ether resin compositions and mixtures thereof with a polystyrene resin along with polyorganosiloxane-based modifiers are described, for example, in European Patent Application No. 0,260,552. It is disclosed therein that very desirable improvements in impact resistance, heat resistance, mechanical strength, surface appearance, and moldability and flow properties are achieved if an additive comprising a silicone-based graft polymer is used.

Both of the above references used a modifier comprising a silicone rubber onto which a vinyl monomer(s) is grafted in the presence of a graft-linking agent. Mention is also made of European Patent Application No. 0,246,537 which also describes the use as an impact modifier of a polyorganosiloxane polymer substrate on which are subsequently grafted first and second vinyl-based polymer stages. European Patent Application No. 0,260,552 also describes soaking the first stage substrate with the second stage monomer(s) to cause an "entangling" thereof with the silicone prior to subsequently polymerizing the second stage. Such modifiers have relatively poor rubber integrity and incompatibility with the resins. This may lead to poor surface appearance and delamination in the molded articles.

Also relevant for its broad teachings is BASF's U.K. Patent No. 1,590,549 which also describes a silicone rubber graft polymer for thermoplastics and particularly Example 6 which discloses a composition comprising 90 weight percent of polycarbonate and 10 weight percent of the graft polymer discussed immediately above; poor compatibility is observed with all of these compositions.

Each of these disadvantages can be overcome by the practice of the present invention where polyorganosiloxane rubber is replaced by a co-homopolymerized substrate(s) of polyorganosiloxane/polyvinyl-based polymer(s) which is subsequently graft polymerized with a (meth)acrylate polymer, a vinyl aromatic/(meth)acrylate copolymer or a vinyl aromatic/vinyl cyanide/(meth)acrylate terpolymer with or without an intermediary stage comprising at least one polymer or at least one cross-linked vinyl polymer or mixture thereof.

These grafted (meth)acrylate polymers exhibit no agglomeration, and blends comprising compounded polycarbonate resins (PC), PC/poly(1,4-butylene terephthalate) (PBT) resins, PC/PBT/polyphenylene ether (PPE) resins, PBT/PPE resins, PC/PPE resins, or mixtures of any of the foregoing mixtures containing the graft polymers of the present invention exhibit enhanced impact strength at a wide variety of temperatures and particularly at low temperature; good tensile strength, surface appearance, and weld lines; good rubber dispersion; a highly desirable blend morphology with the modifier appearing as separate spherical particles; no delamination; and no agglomeration; while maintaining other properties, such as weathering and thermal resistance.

SUMMARY OF THE INVENTION

According to the present invention, there are provided multi-stage polyorganosiloxane/polyvinyl-based graft (meth)acrylate polymer compositions comprising: (a) as a first stage, a polymeric co-homopolymerized substrate comprised of, in combination, an organosiloxane polymer; a vinyl polymer; and optionally units derived from a cross-linking agent or agents, units which serve as a graft-linking agent or agents, units derived from a cross-linking agent or agents and units from the same or different agent or agents which serve as a graft-linking agent or agents, or a mixture of any of the foregoing; and (b) at least one subsequent stage or stages graft polymerized in the presence of any previous stages and which is comprised of a (meth)acrylate polymer, a vinyl aromatic/(meth)acrylate copolymer or a vinyl aromatic/ vinyl cyanide/(meth)acrylate terpolymer.

Also contemplated by the invention are compositions as above defined wherein said subsequent stages comprise (b) (i) a second stage comprising at least one polymer which optionally includes units derived from a cross-linking agent or agents, units which serve as a graft-linking agent or agents, units derived from a cross-linking agent or agents and units from the same or different agent or agents which serve as a graft-linking agent or agents, or a mixture of the foregoing; and (b) (ii) a third stage comprising a (meth)acrylate polymer, a vinyl aromatic/(meth)acrylate copolymer or a vinyl aromatic/vinyl cyanide/(meth)acrylate terpolymer.

DETAILED DESCRIPTION OF THE INVENTION

The multi-stage graft polymer of the present invention is made sequentially by a process which begins with a co-homopolymerization step.

Co-homopolymerization refers to a polymerization step where two distinct polymerization mechanisms are effected concurrently, including simultaneously. In particular, the first stage co-homopolymerization may encompass a siloxane polymerization (e.g. ring opening and condensation mechanism) in conjunction with a concurrent vinyl polymerization. The discrete mechanisms are not seen as competing with each other; rather, two homopolymers are concurrently produced, each retaining its own structure.

This is evidenced by the two distinct glass transition temperatures which can be detected by differential scanning calorimetry (DSC). Preferably, the product of the co-homopolymerization is rubbery instead of a resin-like powder.

Subsequent to the co-homopolymerization of the siloxanes and vinyl-based monomers of the first step, at least one additional graft polymerization process is utilized to achieve the multi-stage polyorganosiloxane/polyvinyl-based graft (meth)acrylate polymers of the invention.

The subsequent graft polymerization is of at least one (meth)acrylate polymer, vinyl aromatic/ (meth)acrylate copolymer or vinyl aromatic/vinyl cyanide/(meth)acrylate terpolymer.

(Meth)acrylates are generally produced in a two-step process wherein acetone is reacted with hydrogen cyanide to form acetone cyanohydrin. This is then heated with an alcohol in the presence of sulfuric acid to produce the corresponding (meth)acrylate monomer. The acrylic monomers can be graft polymerized by free radical process with the aid of an initiator(s). (Meth)acrylate monomers can also be copolymerized with other acrylates like methyl or ethyl acrylates and the like. The vinyl aromatic monomer of the vinyl aromatic/ (meth)acrylate copolymer or of the vinyl aromatic/vinyl cyanide/(meth)acrylate terpolymer can be a styrenic monomer such as styrene; alkyl substituted ring styrenes such as vinyl toluene, divinylbenzene, ethyl styrene or butyl styrene; chlorine ring substituted styrenes such as monochlorostyrene or dichlorostyrene; or the like. The vinyl cyanide monomer can be produced by the condensation of ethylene oxide with hydrogen cyanide to form beta-hydroxy nitrile which is subsequently dehydrated to acrylonitrile, by the vapor-phase ammoxidation of propylene over a suitable catalyst or other methods known to the art. Examples of such vinyl cyanides include, but are not limited to, acrylonitrile or methacrylonitrile. Particularly, preferred subsequent stages graft polymerized in the presence of the first stage comprise methyl methacrylate polymer or styrene/methyl methacrylate copolymer.

The foregoing polyorganosiloxane/polyvinyl-based graft (meth)acrylate polymer can be isolated and utilized, for example, as an impact strength modifying agent for thermoplastic resins as will be discussed in detail below.

Additional cross-linking and/or graft-linking agent(s) can be utilized in this initial stage to provide co-homopolymerized networks from both polymeric constituents which provide greater rubber integrity.

The first stage rubbery substrate is provided by a series of sequential processing steps. In a premixing step, the ingredients required for the co-homopolymerization of the organosiloxane(s) and vinyl-based monomer(s) are premixed with water and suitable cross-linker(s), graft-linker(s), initiator(s) and surfactant(s). The premixed ingredients are homogenized by conventional means. The co-homopolymerization reactions may begin at this early stage of the process, but these reactions are generally slow at room temperature. The homogenized reactants may be directed to a reactor vessel, typically stainless steel or glass flasks under a nitrogen blanket. Heat is applied to facilitate the reaction. For typical 5 to 50 gallon stainless steel reactors, a 3 to 6 hour residence time at 75° C. to 90° C. is adequate to complete the co-homopolymerizations. Cooling for 2 to 6 hours will typically reduce the temperature to at least room temperature where the reaction mass can be held for 3 to 72 hours. Cooling to lower temperatures (e.g. 5° C.) may be sometimes preferred since this may enhance the properties of the formed polyorganosiloxane/-polyvinyl substrate.

Cooling to room temperature or lower allows the polyorganosiloxane portion to build molecular weight, thereby minimizing the extractable silicone rubber fragments and optimizing physical properties of the product for certain applications. Generally, lower temperatures are preferred when it is desired to optimize the elasticity of the formed polyorganosiloxane/ polyvinyl substrate.

The initiator for the siloxane component of the co-homopolymerization can be any ionic ring opening type initiator when cyclic siloxanes are utilized, such as alkylarylsulfonic acids, alkyldiaryldisulfonic acids, alkylsulfonic acids, or the like. The best suited example is dodecylbenzenesulfonic acid which can act as an initiator and at the same time as an emulsifier. In some cases, the joint use of a metal salt of an aforementioned sulfonic acid is also preferred.

The initiator for the styrenic or other vinyl monomers in the co-homopolymerization process can be any organic soluble radical initiator, such as azobisisobutyronitrile (AIBN) and the organic peroxides, e.g. benzoyl peroxide, dichloro benzoyl peroxide, tert-butyl perbenzoate. Also suitable are water soluble radical initiators such as the persulfates. Although it is possible to charge this type of initiator at the beginning of the process, it is preferred that it be charged continuously or incrementally during the co-homopolymerization period. Since persulfate is less stable in the acid conditions of the siloxane polymerization, it is preferred that the persulfate be added over time to keep the vinyl polymerization running. Particle size, pH and total solids measurements can be readily monitored at this stage of the process. A latex rubber emulsion prepared as described above will generally contain particles having an average diameter of 100 to 800 nanometers and preferably 150 to 400 nanometers. The particle size is particularly influenced by the homogenization pressure (and the number of passes through the homogenizer) and the composition of the reaction ingredients. A pressure range of 2000 to 12000 psi is typical and 3000 to 9000 psi is preferred. Multiple passes through the homogenizer may be preferred, but on a large scale a single pass may be most practical.

The foregoing reaction steps must be followed by a suitable neutralization process to provide the products of the invention. The main object of the neutralization is to quench the siloxane polymerization. This is accomplished by adding a caustic solution such as sodium hydroxide, potassium hydroxide, potassium or sodium carbonate, sodium hydrogen carbonate, triethanolamine or triethylamine. The pH of the reaction solution may be raised from a level of 1 to 3 to a pH of at least about 6.5, and typically 7 to 9.

It is often desirable to add additional soap or surfactant to the emulsion formed at the end of the first stage, prior to the neutralization step. Additional surfactant tends to facilitate avoidance of premature agglomeration or flocculation of the co-homopolymerized rubber in the quench step.

The foregoing co-homopolymerization process provides a rubbery network composed of a polyorganosiloxane/polyvinyl substrate. This substrate is the first stage of the graft polymer of the present invention. The next stage involves the graft polymerization of (meth)acrylate-functional (or vinyl aromatic/(meth)acrylate-functional or vinyl aromatic/vinyl cyanide/(-meth)acrylate-functional) moieties onto the graft sites provided by the rubbery substrate particles in the latex formed in the first stage. Intermediary stages are optional but may be preferred for certain applications. The intermediary stages may comprise at least one polymer and optionally units derived from a cross-linking agent or agents, units which serve as a graft-linking agent or agents, units derived from a cross-linking agent or agents and units from the same or different agent or agents which serve as a graft-linking agent or agents, or a mixture of any of the foregoing.

The grafted polymers will preferably be the product of a (meth)acrylate polymerization process. The (meth)acrylate polymerization is accomplished in an emulsion; therefore water soluble initiators are preferred, e.g., potassium persulfate, sodium persulfate and ammonium persulfate. It is practical to add the initiator at the beginning of this step, prior to charging the (meth)acrylate monomers, the vinyl aromatic/ (meth)acrylate co-monomers or the vinyl aromatic/vinyl cyanide/(meth)acrylate termonomers for the second stage polymerization. Other Redox initiator systems, such as cumene hydroperoxide/ferrous sulfate/glucose/sodium pyrophosphate, can also be utilized at this stage as well as other organic peroxides.

Suitable monomers for intermediate graft polymerization for second stage (b)(i) include without limitation: alkenyl aromatic compounds such as styrene, divinylbenzene, alpha-methylstyrene, vinyl toluene, halogenated styrene and the like; methacrylates such as methyl methacrylate and 2-ethylhexyl methacrylate; acrylates such as acrylic acid, methyl acrylate, ethyl acrylate and butyl acrylate; vinyl cyanide compounds such as acrylonitrile and methacrylonitrile; olefins such as ethylene, propylene, butadiene, isoprene, and chloroprene; and other vinyl compounds such as acrylamides, N-(mono or disubstituted alkyl)acrylamides, vinyl acetate, vinyl chloride, vinyl alkyl ethers, allyl (meth)acrylate, triallyl isocyanurate, ethylene dimethacrylate, diallyl maleate, maleic anhydride; maleimide compounds such as malei- mide or N-phenyl (or alkyl) maleimide; and mixtures of these monomers.

Sequential multi-stage polymerization processes of this type are sometimes referred to as core-shell processes. It is preferred, however, to describe them as multi-stage graft polymerization processes wherein the initial stage provides a co-homopolymerized organosiloxane/vinyl-based substrate. This substrate may have sufficient grafting sites for a second or subsequent stage to be grafted thereto. Grafted (meth)acrylate polymer, vinyl aromatic/(meth)acrylate copolymer or vinyl aromatic/vinyl cyanide/(meth)acrylate terpolymer as the outermost stage is preferred, yet many other intermediary stages such as a polystyrene or a poly(butyl acrylate) stage are also contemplated.

In general, the first stage substrate comprising the co-homopolymerized polyorganosiloxane/ polyvinyl-based substrate will comprise approximately 5 to 95 weight percent of the total graft polymer-based upon the weight of the first stage and the subsequent stage or stages taken together. Preferably, the first stage will comprise approximately 30 to 90 weight percent on the same basis. Correspondingly, the subsequent stages, comprising the additional grafted (meth)acrylate polymer, vinyl aromatic/(meth)acrylate copolymer or vinyl aromatic/vinyl cyanide/(meth)acrylate terpolymer will comprise approximately 95 to 5 weight percent and preferably approximately 70 to 10 weight percent on the same basis. In the multi-stage systems, preferably, the ratio of first stage substrate polymer (a) to second stage polymer (b)(i) is 10:90 to 90:10 and the amount of third stage polymer (b)(ii) comprises from about 10 to about 90 parts by weight per 100 parts by weight of (a), (b)(i), and (b)(ii) combined.

The organosiloxanes useful in the first stage co-homopolymerization are any of those known to produce silicone elastomers and may include those which are hydroxy-, vinyl-, hydride- or mercapto-end capped linear organosiloxane oligomers.

The polyorganosiloxanes illustratively will be comprised primarily of units of the formula $R_nSiO_{(4-n)/2}$ wherein R is hydrogen or a monovalent hydrocarbon radical of about 1 to 16 carbon atoms and n is 0, 1 or 2.

Preferred among the organosiloxanes are those in cyclic form having three or more siloxane units, and most preferred are those having three to six units. Such organosiloxanes include without limitation, for example, hexamethylcyclotrisiloxane, octamethylcyclotetrasiloxane, decamethylcyclopentasiloxane, dodecamethylcyclohexasiloxane, trimethyltriphenylcyclotrisiloxane, tetramethyltetraphenylcyclotetrasiloxane, tetramethyltetravinylcyclotetrasiloxane and octaphenylcyclotetrasiloxane. These or similar organosiloxanes may be used alone or in combination.

The vinyl monomers useful in conjunction with the co-homopolymerization of organosiloxanes in the first stage are preferred to be alkenyl aromatic compounds such as styrene, divinylbenzene, alphamethylstyrene, vinyl toluene, vinyl naphthalene, vinyl anthracene, and halogenated styrene or its derivatives. Other suitable vinyl monomers include acrylic acids and acrylates such as methyl-, ethyl-, allyl-, or butyl acrylate; methacrylates such as methyl methacrylate or 2-ethylhexyl methacrylate; vinyl cyanides such as acrylonitrile or methacrylonitrile; olefins such as ethylene, propylene, butadiene, isoprene, chloroprene, vinylimidazole, 5-vinyl-2-norbornene, vinyl pyridine, vinyl pyrrolidine, vinyl acetate, vinyl alkyl ethers, vinyl chloride, vinyl furan, N-vinyl carbazole, allyl (meth)acrylate, triallyl isocyanurate, ethylene di(meth)acrylate, butylene di(meth)acrylate, diallyl maleate, maleic anhydride; maleimide compounds such as maleimide or N-phenyl (or alkyl)maleimides; acrylamides, N-(mono or di-substituted) acrylamides; and mixtures of any of these monomers. In general, any rubbery or glassy vinyl type monomer may be used which can be mixable with the organosiloxanes. Typically, the vinyl component of the first stage co-homopolymer will be present in an amount of approximately 3 to 97 weight percent, and correspondingly, the organosiloxane component will be present in an amount of approximately 97 to 3 weight percent. Preferably, the vinyl-based component will comprise approximately 5 to 45 weight percent of the first stage of the co-homopolymerized substrate.

Platinum compounds are often utilized in conjunction with polyorganosiloxane compositions in order to enhance the flame retardance of the latter. Platinum complexes are also used as catalysts in certain hydrosilation processes although such catalysts are not necessary for the practice of the present invention. As flame retarding additives, however, there may optionally be utilized the reaction product of chloroplatinic acid and organosilicon compounds as described in U.S. Pat. No. 3,220,972. Another platinum compound is seen in U.S. Pat. No. 3,775,452 describing platinum-containing organopolysiloxanes.

The cross-linker composition used in conjunction with the organosiloxane component of the present compositions can have the general formula $R^2{}_n$—$Si(OR^1)_{4-n}$ wherein n is 0, 1, or 2, preferably 0 or 1, and each $R^1$ independently represents hydrogen or a monovalent hydrocarbon radical selected from among alkyl or aryl radicals having 1 to 16 carbon atoms, preferably methyl, ethyl and phenyl. $R^2$ can be the same as $R^1$ or can be a vinyl, alkenyl, thio, or (meth)acryloxyalkyl functional radical. When $R^2$ is a vinyl, alkenyl, thio, or acryloxyalkyl radical and n is 1, the cross-linker compound can also act as a graft-linker.

A preferred cross-linker compound is tetraethoxysilane. A combination cross-linking and graft-linking compound is vinyltriethoxysilane. Another suitable choice is gamma-methacryloxypropyltrimethoxysilane.

The multi-stage polyorganosiloxane/polyvinyl-based (meth)acrylate graft product of the present invention can be isolated by conventional means such as hot solution coagulation. For example, an electrolytic solution of about 0.5 to 5 percent aluminum sulfate or magnesium sulfate in water can be prepared and heated to about 75° to 95° C. When the latex is added with agitation, the graft product will precipitate and can be held at elevated temperature for about 10 minutes whereupon it may be filter washed. Commercial latex isolation techniques such as spray dryers may also be utilized.

In a preferred feature of the invention, the isolated multi-stage graft polymer may be utilized as a modifier for thermoplastic resins, particularly a mixture (A) of (i) a polycarbonate resin and (ii) a polyester resin; a mixture (A-1) of (ii) a polyester resin and (iii) a polyphenylene ether resin; a mixture (A-2) of (i) a polycarbonate resin, (ii) a polyester resin, and (iii) a polyphenylene ether resin; or a mixture (A-3) of any of the foregoing.

The polycarbonate resin (i) in the invention is produced by using a dihydroxydiarylalkane as the main starting material and optionally has branched chains. Such polycarbonate resins are manufactured by known processes and generally by the reaction of a dihydroxy compound and/or a polyhydroxy compound with either phosgene or a diester of carbonic acid. Suitable dihydroxydiarylalkanes include those having at least one alkyl group, chlorine atom, or bromine atom in any of the positions ortho to the hydroxyl groups. Preferred examples of the dihydroxydiarylalkane include 4,4'-dihydroxy-2,2-diphenylpropane(bisphenol-A); tetramethyl(bisphenol-A); and bis-(4-hydroxyphenyl)-p-diisopropylbenzene. The branched polycarbonate resin can be produced, for instance, by the above-mentioned reaction but using, for example, 0.2 to 2 mole percent of a polyhydroxy compound in place of a part of the dihydroxy compound. Examples of the polyhydroxy compound include 1,4-bis-(4',4,2-dihydroxytriphenylmethyl)-benzene; phloroglucinol; 4,6-dimethyl2,4,6-tris-(4-hydroxyphenyl)-heptene-2; 4,6-dimethyl2,4,6-tris-(4-hydroxyphenyl)-heptane,1,3,5-tris-(4-hydroxyphenyl)-benzene; 1,1,1-tris-(4-hydroxyphenyl)ethane; and 2,2-bis-(4,4-(4,4'-dihydroxyphenyl)-cyclohexyl)-propane. Particularly preferred polycarbonate resins are of the bisphenol-A type.

The thermoplastic polyester resin (ii) in the present invention is derived from an aliphatic or cycloaliphatic diol, or mixtures thereof, containing from 2 to about 10 carbon atoms and at least one aromatic dicarboxylic acid. Preferred polyesters are derived from an aliphatic diol and an aromatic dicarboxylic acid have repeated units of the following general formula:

wherein n is an integer of from 2 to 4. The most preferred polyester is poly(ethylene terephthalate).

Also contemplated herein are the above polyesters with minor amounts, e.g., from 0.5 to about 2 percent by weight, of units derived from aliphatic acid and/or aliphatic polyols, to form copolyesters. The aliphatic polyols include glycols, such as poly(ethylene glycol). All such polyesters can be made following the teachings of, for example, U.S. Pat. Nos. 2,465,319 and 3,947,539.

The polyesters which are derived from a cycloaliphatic diol and an aromatic dicarboxylic acid are prepared, for example, by condensing either the cis- or trans-isomer (or mixtures thereof) of, for example, 1,4-cyclohexanedimethanol with an aromatic dicarboxylic acid so as to produce a polyester having recurring units of the following formula:

wherein the cyclohexane ring is selected from the cis- and trans-isomers thereof and R represents an aryl radical containing 6 to 20 carbon atoms and which is the decarboxylated residue derived from an aromatic dicarboxylic acid.

Examples of aromatic dicarboxylic acids represented by the decarboxylated residue R are isophthalic or terephthalic acid, 1,2-di-(p-carboxyphenyl) ethane, 4,4'-dicarboxydiphenyl ether, etc., and mixtures of these. All of these acids contain at least one aromatic nucleus. Acids containing fused rings can also be present, such as in 1,4- or 1,5-naphthalenedicarboxylic acids. The preferred dicarboxylic acids are terephthalic acid or a mixture of terephthalic and isophthalic acids.

Another preferred polyester may be derived from the reaction of either the cis- or trans-isomer (or a mixture thereof) of 1,4-cyclohexanedimethanol with a mixture of isophthalic and terephthalic acids. Such a polyester would have repeating units of the formula:

Still another preferred polyester is a copolyester derived from a cyclohexanedimethanol, an alkylene glycol and an aromatic dicarboxylic acid. These copolyesters are prepared by condensing either the cis- or trans-isomer (or mixtures thereof) of, for example, 1,4-cyclohexanedimethanol and an alkylene glycol with an aromatic dicarboxylic acid so as to produce a copolyester having units of the following formula:

wherein the cyclohexane ring is selected from the cis- and trans-isomers thereof, R is as previously defined, n is an integer of 2 to 4, the x units comprise from about 10 to about 90 percent by weight and the y units comprise from about 90 to about 10 percent by weight.

Such a preferred copolyester may be derived from the reaction of either the cis- or trans-isomer (or mixtures thereof) of 1,4-cyclohexanedimethanol and ethylene glycol with terephthalic acid in a molar ratio of 1:2:3. These copolyesters have repeating units of the following formula:

wherein x and y are as previously defined.

The polyesters described herein are either commercially available or can be produced by methods well known in the art, such as those set forth in, for example, U.S. Pat. No. 2,901,466.

The polyesters used herein have an intrinsic viscosity of from about 0.4 to about 2.0 dl/g as measured in a 60:40 phenol:tetrachloroethane mixture or similar solvent at 20°–30° C.

The polyphenylene ether resin (iii) in the invention is a homopolymer or copolymer represented by the formula wherein $Q^1$ through $Q^4$ are selected independently of each other from the group consisting of hydrogen and hydrocarbon radicals and m denotes a number of 30 or more.

Examples of such polyphenylene ether resins include poly(2,6-dimethyl-1,4-phenylene)ether, poly(2,6-diethyl-1,4-phenylene)ether, poly(2,6-dipropyl-1,4-phenylene)ether, poly(2-methyl-6-ethyl-1,4-phenylene)ether, poly(2-methyl-6-propyl-1,4-phenylene)ether, poly(2-ethyl-6-propyl-1,4-phenylene)ether, copolymer of (2,6-dimethyl-1,4-phenylene)ether with (2,3,6-trimethyl 1,4-phenylene)ether, copolymer of (2,6-diethyl-1,4-phenylene)ether with (2,3,6-trimethyl-1,4-phenylene)ether, and copolymer of (2,6-dimethyl-1,4-phenylene)ether with (2,3,6-triethyl-1,4-phenylene)ether. Of these polymers, preferred are poly(2,6-dimethyl-1,4-phenylene)ether and a copolymer of (2,6-dimethyl-1,4-phenylene)ether with (2,3,6-trimethyl-1,4-phenylene)ether. Particularly preferred is a poly(2,6-dimethyl-1,4-phenylene ether) resin. There is no particular restriction on the polymerization degree of the polyphenylene ether resin used in the invention, but it is preferable to use the resin having a reduced viscosity of 0.3 to 0.7 dl/g measured in chloroform at 25° C. Resins having a less reduced viscosity than 0.3 dl/g tend to exhibit low heat stability while resins having a reduced viscosity exceeding 0.7 dl/g tend to have inferior moldability.

The amounts of components (A), (A-1), (A-2), or (A-3) and (B) can vary broadly, but will usually be in the range of from about 1 to about 99 parts by weight of (A), (A-1), (A-2), or (A-3) to from about 99 to about 1 part by weight of (B), per 100 parts by weight of (A), (A-1), (A-2), or (A-3) and (B) together. Preferably, (A), (A-1), (A-2), or (A-3) comprises from about 99 to about 37 parts by weight and (B) comprises from about 1 to about 63 parts by weight.

The compositions can also be further rendered more flame retardant with effective amounts, e.g., between about 1 and 30 parts by weight per 100 parts by weight of resin, of a flame retardant agent as component (C), e.g., elementary red phosphorous, phosphorous compounds, halogen compounds, nitrogen compounds, antimony oxide, zinc oxide, metal salt(s) of sulfonated diphenylsulfone, metal salt(s) of trichlorobenzenesulfonic acid, mixtures thereof and the like.

Additionally, reinforcing fillers as component (D); dyes and colored pigments; heat stabilizers; thermooxidative stabilizers and UV stabilizers; waxes, lubricants and processing assistants which ensure trouble-free extrusion and injection molding; and antistatic agents may be added to the molding compositions according to the invention.

The reinforcing filler (D) can be comprised of any organic or inorganic fillers including, but not limited to glass fiber, carbon fiber, aramid fiber, metallic fiber, asbestos, glass beads, glass flakes, calcium carbonate, talc, mica, aluminum oxide, boron nitride, calcium silicate, clay or metal powders or whiskers.

Conventional processes for mixing thermoplastic polymers can be used for the manufacture of molding compositions within the invention. For example, the compositions can be manufactured by using any suitable mixing equipment, e.g., cokneaders or extruders. The mixing temperatures are in general from 150° to 370° C., preferably from 200° to 345° C. The polymers are fused and thoroughly mixed, with or without the other additives described.

The addition of the graft polymers described above does not adversely influence the processing stability of the thermoplastically processable plastics material.

DESCRIPTION OF THE PREFERRED EMBODIMENTS

The following examples illustrate the invention without limitation. All parts given are by weight unless otherwise indicated. Impact strengths are reported as notched Izod (NI) according to ASTM D-256 at 23° C. unless otherwise specified. Weld line is measured on one-eighth inch unnotched Izod bars molded in a double-gated mold. Tensile properties are measured by ASTM D-638 as Tensile Yield Strength, Tensile Break Strength, and Elongation Break Strength. Surface gloss, 60°, is measured by ASTM D-523, and yellowing is measured by yellowness index (YI).

A single slash is used between monomers of a single stage and a double slash or a hyphen is used as a shorthand method of indicating separation between stages. The first stage to be polymerized is written before the double slash or hyphen, and subsequent stages are written subsequently.

PROCEDURE A 79.1 parts of octamethylcyclotetrasiloxane (D4), 9.8 parts of tetraethoxysilane (TEOS), 2.3 parts of gamma-methacryloxypropyltrimethoxysilane (APTMOS), and 8.8 parts of 2,4,6,8-tetramethyltetravinylcyclotetrasiloxane (VMD4) are mixed to form Solution 1. 4.9 parts of styrene (S) and 0.1 part of divinylbenzene (DVB) are mixed to form Solution 2. 1.00 part of dodecylbenzenesulfonic acid (DBSA) is dissolved in 300 parts of deionized water (DI $H_2O$) to form Solution 3. 0.025 part of potassium persulfate ($K_2S_2O_8$) is dissolved in 1.25 parts of deionized water to form Solution 4. Solutions 1 and 2 are admixed and stirred for 30 minutes. The resultant mixture is added to Solution 3, stirred well, and homogenized in two stages at 6500 psi. The latex is transferred to a reactor equipped with an overhead stirrer, a condenser, an argon sparge tube, an addition funnel, and a thermometer with a temperature controller. A continuous stream of argon gas is bubbled through the latex for 30 minutes with constant stirring. The temperature is raised to 75° C. under an argon blanket and left stirring at 75° C. for 15 minutes. Solution 4 is added dropwise to the latex over a one hour period, and particle size and solid content measurements are monitored every hour throughout the course of polymerization. The heat is removed after six hours, but stirring is continued under an argon blanket overnight. The latex is titrated to pH 8.5 with an aqueous potassium carbonate solution ($K_2CO_3$). The final co-homopolymerized substrate latex has a volume averaged particle size of 228 nanometers in diameter and a solids content of 19.1 percent. Degree of swelling, measured using toluene as a solvent, is 6.8.

EXAMPLE 1

366.5 parts (70 parts of dry rubber) of latex prepared by the method of Procedure A is placed in a reaction vessel similar to that used in Procedure A. The latex is purged with argon gas and heated to 75° C. while being stirred constantly. 0.15 part of potassium persulfate initiator is added. Fifteen minutes later, 30 parts of methyl methacrylate (MMA) are added dropwise over a period of less than one hour. The heat is applied for a total time of six hours. The latex is left under argon overnight and yields the CSiM modifier ((Si/PS)-MMA wt. ratio of 70:30). The volume averaged mean particle diameter is 227 nanometers, and graft efficiency is 94 percent using acetone as the extractant.

EXAMPLE 2

The procedure of Example 1 is followed substituting 419 parts (80 parts of dry rubber) of latex prepared by the method of Procedure A, and 0.005 part of potassium persulfate for the corresponding components, and 7 parts of styrene, and 0.14 parts of divinylbenzene. The styrene addition period is less than one hour and is then followed immediately by disperse addition of 13 parts of methyl methacrylate, yielding the CSiM modifier ((Si/PS)-S-MMA wt. ratio of 80:7:13). The volume averaged mean particle diameter is 215 nanometers, and graft efficiency is 96 percent.

EXAMPLE 3

Figure 1:
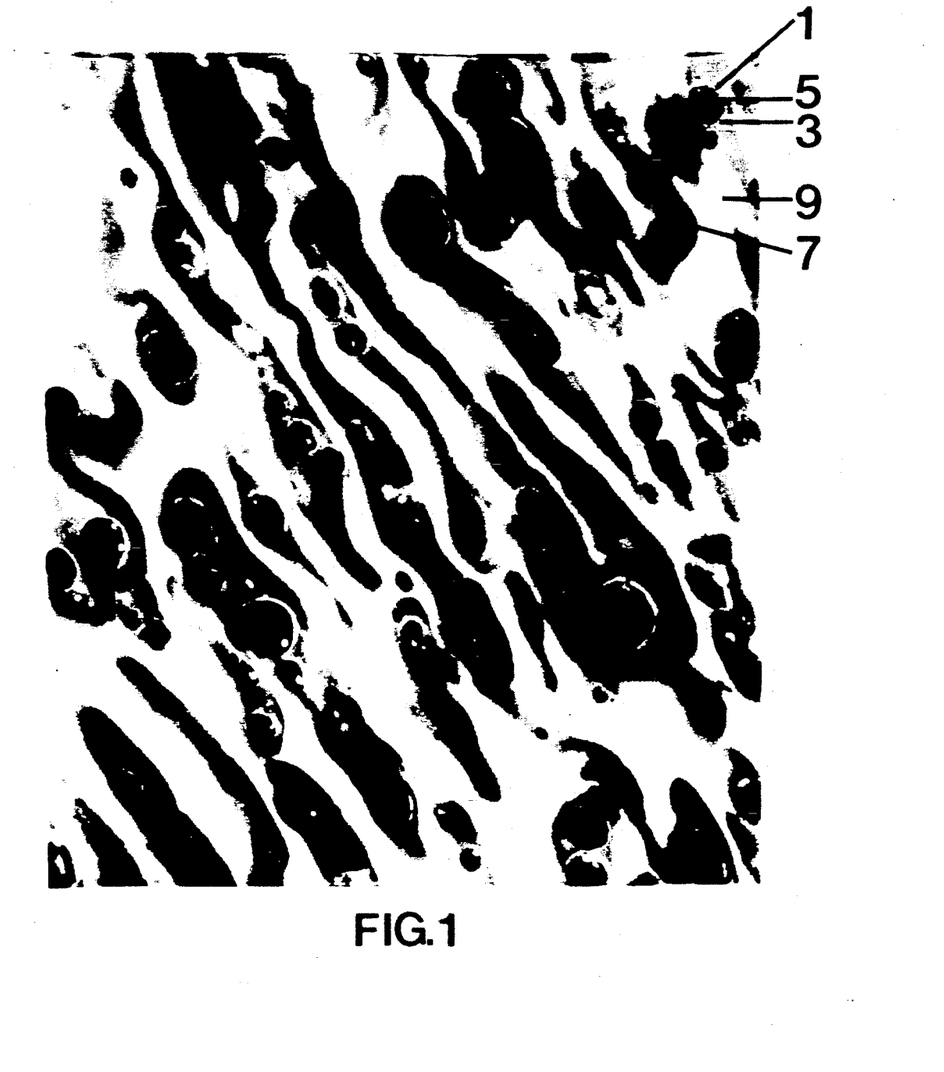
FIG. 1 is a transmission electron micrograph of a blend of PC, PBT and CSiM ((Si/PS)-MMA wt. ratio of 70:30) in accordance with the invention showing no agglomeration and excellent dispersion of the modifier in the PC phase.

A well mixed dry blend of 40 parts polyester (PBT, poly(1,4-butylene terephthalate) Valox ® 315-General Electric Company), 50 parts of polycarbonate (PC, poly(bisphenol-A carbonate) Lexan ® 140-General Electric Company), 10 parts of CSiM modifier ((Si/PS)-MMA wt. ratio of 70:30) prepared by the method of Example 1, and 0.9 part of a stabilizer package is extruded on a Welding Engineering twin screw extruder operating at 400 rpm and with barrel zones set at 250, 375, 510, 510, 510 and 510° F. Tensile and notched Izod bars are molded on a Boy Injection Molder at 260° C. Morphology is illustrated in FIG. 1. There is good rubber dispersion, good blend morphology with the CSiM modifier (1) appearing as separate spherical particles and no agglomeration in the PC (7) phase of the PC (7)/PBT (9) blend. The (Si/PS) stage (5) and the MMA stage (3) are also illustrated. No delamination or surface mottling is seen. Properties are summarized in Table 1.

COMPARATIVE EXAMPLE 3A*

The procedure of Example 3 is followed except omitting the CSiM modifier. Properties are summarized in Table 1.

EXAMPLE 4

A composition as prepared in Example 3 is thermally aged by storing at 90° C. for 96 hours. The good rubber dispersion and good blend morphology of the CSiM modifier are still unaffected after thermal aging. Properties are summarized in Table 1.

EXAMPLE 5

Figure 2:
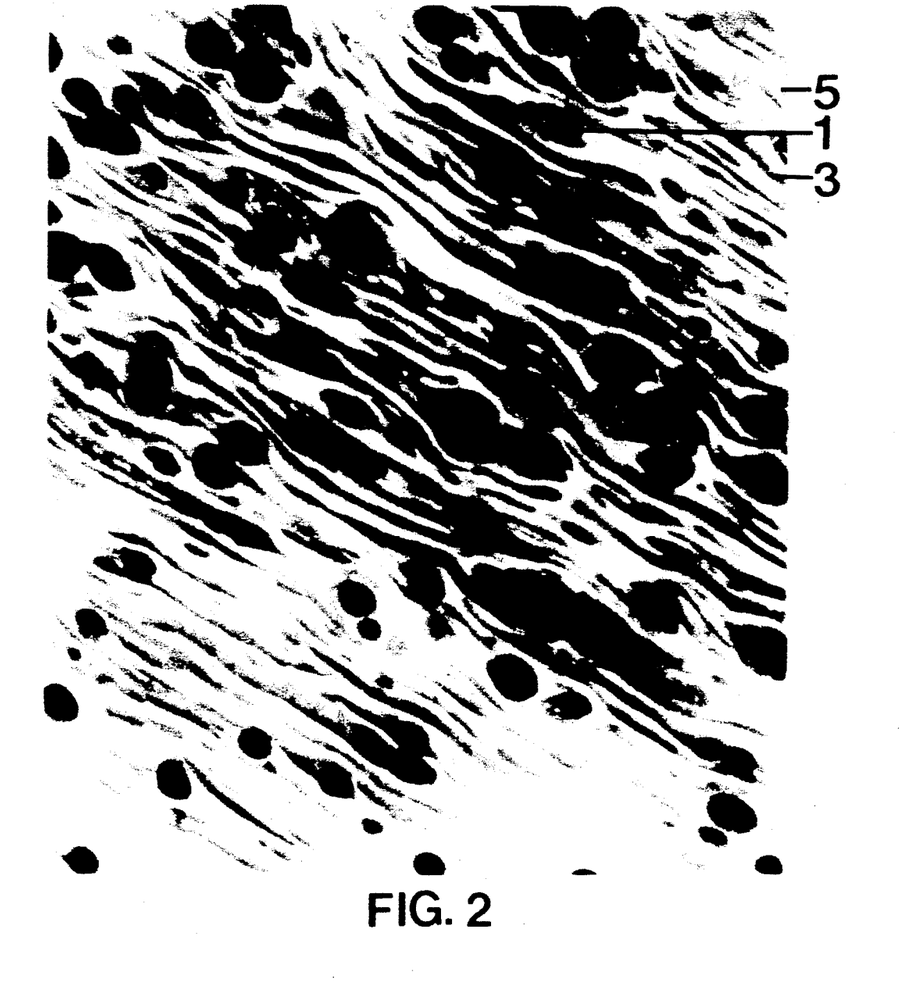
FIG. 2 is a transmission electron micrograph of a blend of PC, PBT and CSiM ((Si/PS)-S-MMA wt. ratio of 80:7:13) in accordance with the invention showing no agglomeration and excellent dispersion of the modifier in the PC phase.

The procedure of Example 3 is followed substituting CSiM ((Si/PS)-S-MMA wt. ratio of 80:7:13) prepared by the method of Example 2, for the CSiM. Morphology is illustrated in FIG. 2. There is good rubber dispersion, good blend morphology with the CSiM modifier (1) appearing as separate spherical particles and no agglomeration in the PC (3) phase of the PC (3)/PBT (5) blend. No delamination or surface mottling are seen. Properties are summarized in Table 1.

EXAMPLE 6

A composition as prepared in Example 5 is thermally aged by storing at 90° C. for 96 hours. The good rubber dispersion and good blend morphology of the CSiM modifier are still unaffected after thermal aging. Properties are summarized in Table 1.

Examples 3-6 when compared with Comparative Example 3A* demonstrate improved ductility, high notched Izod values at a wide range of temperatures, good tensile strength, and exhibit no surface mottling or delamination in articles prepared from blends containing the CSiM modifiers of the present invention. Particularly, Examples 3 and 5 surprisingly show improved and excellent rubber dispersion, excellent blend morphology with the modifier appearing as separate spherical particles and no agglomeration in the blends.

TABLE 1

| Compositions Comprising Polyester, Polycarbonate and CSiM | | | | | |
|---|---|---|---|---|---|
| | EXAMPLE | | | | |
| | 3 | 3A* | 4 | 5 | 6 |
| Polyester[A] | 40 | 40 | 40 | 40 | 40 |
| Polycarbonate[B] | 50 | 50 | 50 | 50 | 50 |
| Stabilizer Package | 0.9 | 0.9 | 0.9 | 0.9 | 0.9 |
| CSiM[C] | 10 | — | 10 | — | — |
| CSiM[D] | — | — | — | 10 | 10 |
| Tensile Yield Strength (psi) | 7526 | — | 8565 | 7327 | 8109 |
| Elongation Break Strength (%) | 124 | — | 121 | 167 | 147 |
| Tensile Break Strength (psi) | 7072 | — | 7531 | 7611 | 7653 |
| Notched Izod (ft-lbs/in) | | | | | |
| 25° C. | 15.7 | 1 | 14.0 | 15.5 | 14.8 |
| 0° C. | 12.8 | — | — | 14.9 | — |
| −15° C. | 11.8 | — | — | 13.7 | — |
| −30° C. | 8.1 | — | — | 12.3 | — |
| −45° C. | — | — | — | — | — |
| −50° C. | 5.6 | — | — | 7.6 | — |
| −55° C. | — | — | — | — | — |
| Morphology by TEM-dispersion | exc. | — | — | exc. | — |
| (FIG.) | (1) | (—) | (—) | (2) | (—) |

[A]poly(1,4-butylene terephthalate) - Valox ® 315 - General Electric Company
[B]poly(bisphenol-A carbonate) - Lexan ® 140 - General Electric Company
[C](Si/PS)-MMA wt. ratio of 70:30, Example 1
[D](Si/PS)-S-MMA wt. ratio of 80:7:13, Example 2

EXAMPLE 7

The procedure of Example 3 is followed substituting a dry blend of 54 parts of polyester (PBT, poly(1,4-butylene terephthalate), Valox ® 315), 36 parts of polyphenylene ether (PPE) (epoxy functionalized) and 10 parts of CSiM modifier ((Si/PS)-MMA wt. ratio of 70:30) prepared by the method of Example 1, and molding at 280° C. There is no agglomeration in the blends, good rubber dispersion and good blend morphology with the CSiM modifier appearing as separate spherical particles. No delamination or surface mottling are seen. Properties are summarized in Table 2.

COMPARATIVE EXAMPLE 7A*

The procedure of Example 7 is followed omitting the CSiM modifier. Properties are summarized in Table 2.

Example 7 when compared with Comparative Example 7A* demonstrates the good ductility that polyorganosiloxane/polyvinyl-based CSiM modifiers can impart to PBT/PPE blended thermoplastic molded articles. Additionally, Example 7 shows no agglomeration, no delamination, no surface mottling and markedly improved rubber dispersion and blend morphology.

TABLE 2

Compositions Comprising Polyester, PPE and CSiM

| | EXAMPLE | |
|---|---|---|
| | 7 | 7A* |
| Polyester[A] | 54 | 54 |
| PPE (Epoxy Functionalized) | 36 | 36 |
| CSiM[B] | 10 | — |
| Tensile Yield Strength (psi) | 7115 | — |
| Tensile Break Strength (psi) | — | — |
| Elongation Break Strength (%) | 49 | — |
| Notched Izod @ 25° C. (ft-lbs/in) | 2.14 | 0.5 |

[A]poly(1,4-butylene terephthalate) - Valox ® 315 - General Electric Company
[B](Si/PS)-MMA wt. ratio of 70:30, Example 1

EXAMPLE 8

The procedure of Example 3 is followed substituting a dry blend of 47.55 parts of polyester (PBT, Valox ® 295, General Electric Company), 30.0 parts of polycarbonate (Lexan ® 141, General Electric Company), 0.45 parts of a stabilizer package, 12 parts of CSiM ((Si/PS)-MMA wt. ratio of 70:30) prepared by the method of Example 1 and 10 parts of glass filler; and using a 2.5" Prodex II single screw extruder. The molded articles are tested and yield a YI of 9.7, a surface gloss (60°) of 72.6, a specific gravity of 1.30 and a one-eighth inch notched Izod of 1.6 ft-lbs/in. No delamination, no surface mottling, no agglomeration, good rubber dispersion and good blend morphology are seen from this glass filled high impact system comprising PBT, polycarbonate, stabilizer and the CSiM modifiers of the present invention exhibit.

EXAMPLE 9

The procedure of Example 3 is followed substituting a dry blend of 46 parts of PBT (Valox ® 315), 30 parts of polyphenylene ether (PPE) (vacuum vented), 14 parts of polycarbonate (HILEX ®—General Electric Company) and 10 parts of CSiM ((Si/PS)-MMA wt. ratio of 70:30) prepared by the method of Example 1. There is no agglomeration in the blends, good rubber dispersion and good blend morphology with the CSiM modifier appearing as separate spherical particles. No delamination or surface mottling are seen. Properties are summarized in Table 3.

COMPARATIVE EXAMPLE 9A*

The procedure of Example 9 is followed omitting the CSiM modifier. Properties are summarized in Table 3.

EXAMPLE 10

The procedure of Example 9 is followed substituting 10 parts of CSiM ((Si/PS)-S-MMA wt. ratio of 80:7:13) prepared by the method of Example 2 for the CSiM. There is good rubber dispersion, good blend morphology with the CSiM modifier appearing as separate spherical particles and no agglomeration in the blends. No delamination or surface mottling are seen. Properties are summarized in Table 3.

EXAMPLE 11

Figure 3:
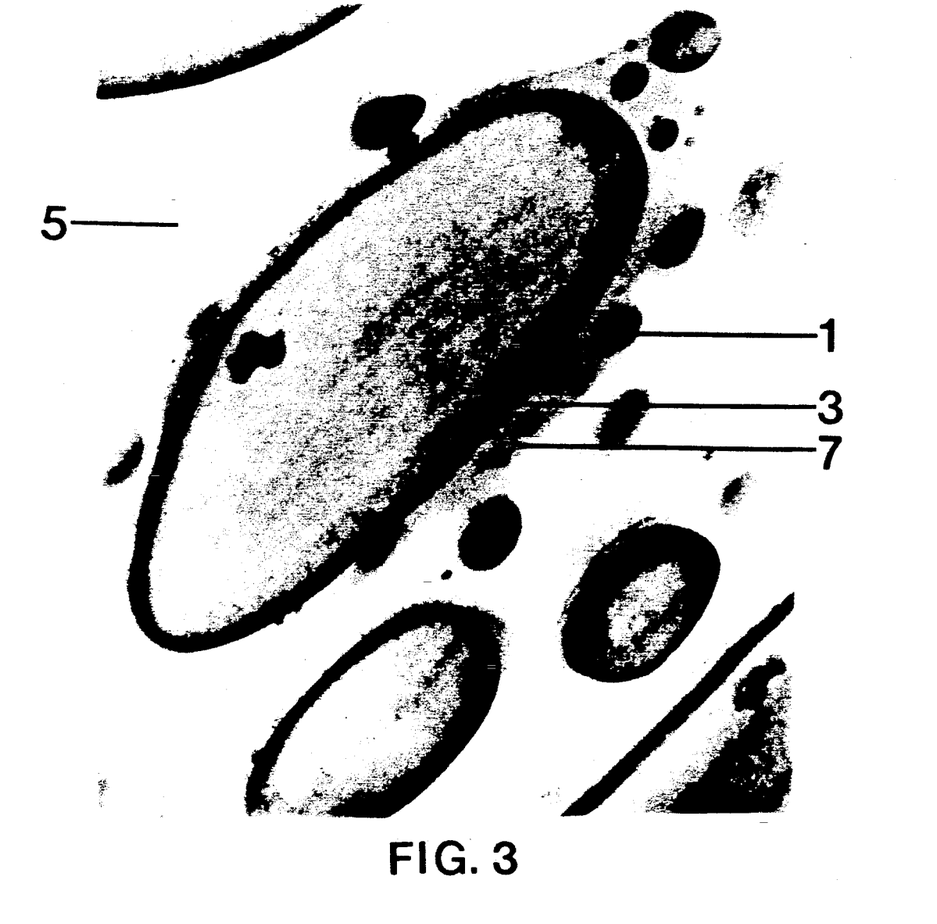
FIG. 3 is a transmission electron micrograph of a blend of PPE, PBT, PC and CSiM ((Si/PS)-MMA wt. ratio of 70:30) in accordance with the invention showing no agglomeration and excellent dispersion of the modifier in the PC phase.

A well mixed dry blend of 97.5 parts (21 parts of the final blend) of polycarbonate (HILEX ®) and 2.5 parts (0.55 part of the final blend) of CSiM ((Si/PS)MMA wt. ratio of 70:30) prepared by the method of Example 1 is extruded. A dry blend of the resultant composition, 47 parts of PBT (Valox ® 315) and 31.45 parts of polyphenylene ether (PPE) is extruded. Morphology is illustrated in FIG. 3. There is excellent rubber dispersion with the CSiM modifier (1) appearing as separate spherical particles and no agglomeration in the PC phase of the PBT (5)/PPE (3)/PC (7) blend.

Examples 9 and 10 when compared with Comparative Example 9A* demonstrate the much improved ductility that polyorganosiloxane/polyvinyl-based graft MMA polymer modifiers impart to PBT/PPE/PC blended thermoplastic molded articles.

TABLE 3

Compositions Comprising PBT, PPE, PC and CSiM

| | EXAMPLE | | | |
|---|---|---|---|---|
| | 9 | 9A* | 10 | 11 |
| Polyester[A] | 46 | 46 | 46 | 47 |
| PPE (Vacuum Vented) | 30 | 30 | 30 | 31.45 |
| Polycarbonate[B] | 14 | 14 | 14 | 21 |
| CSiM[C] | 10 | — | — | 0.55 |
| CSiM[D] | — | — | 10 | — |
| Tensile Yield Strength (psi) | 7101 | — | 6456 | — |
| Elongation Break Strength (%) | 41 | — | 45 | — |
| Notched Izod @ 25° C. (ft-lbs/in) | 1.3 | 0.6 | 1.1 | — |

[A]poly(1,4-butylene terephthalate) - Valox ® 315 - General Electric Company
[B]poly(bisphenol-A carbonate) - Lexan ® 141 - General Electric Company
[C](Si/PS)-MMA wt. ratio of 70:30, Example 1
[D](Si/PS)-S-MMA wt. ratio of 80:7:13, Example 2

In the foregoing examples, the degree of swelling can be determined in the following fashion:

A prepared polyorganosiloxane-based latex is coagulated by adding it to about 4 times its volume of methanol and water (1:1 volume ratio) containing 1 wt. percent $MgSO_4$. The precipitated rubber is washed and vacuum-dried at 70° C. overnight. Approximately 1 g of the dry silicone-based rubber is immersed in 100 ml toluene for 20 to 24 hours at ambient temperature and allowed to swell. The excess toluene is separated by decantation. The swelled polymer is vacuum-dried at 60° C. overnight, and the resulting polymer is weighed. The degree of swelling is calculated as: DS=((weight of swelled polymer)−(weight of dry polymer)) divided by (weight of dry polymer).

Graft Efficiency can be determined by weighing dry multi-stage polyorganosiloxane-based graft polymer in a weighed thimble which is Soxhlet extracted by acetone for 20 to 22 hr. After vacuum-drying, the residue of the extraction is weighed. The graft efficiency is calculated as: GF (%)=((weight of grafted monomer(s)×100) divided by (weight of total monomer(s) polymerized).

All patents and applications mentioned above are hereby incorporated by reference.

Many variations of the present invention will suggest themselves to those skilled in this art in light of the above, detailed description. All such obvious variations are within the full scope of the appended claims.

We claim:

1. A multi-stage polyorganosiloxane/polyvinyl-based graft polymer composition comprising:
   (a) as a first stage, a substrate selected from
      (i) a polymeric co-homopolymerized substrate comprised of, in combination, an organosiloxane polymer and at least one vinyl-based polymer;
      (ii) a polymeric co-homopolymerized substrate comprised of, in combination, an organosiloxane polymer, at least one vinyl-based polymer, and units which are derived from a cross-linking agent or agents;
      (iii) a polymeric co-homopolymerized substrate comprised of, in combination, an organosiloxane polymer, at least one vinyl-based polymer, and units which serve as a graft-linking agent or agents;
      (iv) a polymeric co-homopolymerized substrate comprised of, in combination, an organosiloxane polymer, at least one vinyl-based polymer, units which are derived from a cross-linking agent or agents and units from the same or different agent or agents which serve as a graft-linking agent or agents; or
      (v) a polymeric co-homopolymerized substrate comprised of, in combination, an organosiloxane polymer, at least one vinyl-based polymer, and a mixture of any of units which are derived from a cross-linking agent or agents, units which serve as a graft-linking agent or agents, or units derived from cross-linking agent or agents and units from the same or different agent or agents which serve as a graft-linking agent or agents; and
   (b) at least one subsequent stage or stages graft polymerized in the presence of any previous stage and which is comprised of a (meth)acrylate polymer, a vinyl aromatic/(meth)acrylate copolymer or a vinyl aromatic/vinyl cyanide/(meth)acrylate terpolymer.

2. A composition as defined in claim 1 wherein said organosiloxane/vinyl co-homopolymer first stage substrate (a) comprises approximately 5 to 95 weight percent of the total graft polymer composition based upon the weight of said first stage substrate and any subsequent graft stages taken together.

3. A composition as defined in claim 2 wherein said first stage substrate (a) comprises approximately 30 to 90 weight percent of the total graft polymer composition.

4. A composition as defined in claim 1 wherein said first stage substrate (a) is comprised of approximately 3 to 97 weight percent of organosiloxane polymer and correspondingly approximately 97 to 3 weight percent of vinyl-based polymer.

5. A composition as defined in claim 4 wherein said first stage substrate (a) is comprised of approximately 5 to 45 weight percent of vinyl-based polymer.

6. A composition as defined in claim 1 wherein said organosiloxane polymer is comprised primarily of a mixture of units of the formula $$R_nSiO_{(4-n)/2}$$

wherein R is hydrogen or a monovalent hydrocarbon radical of about 1 to 16 carbon atoms and n is 0, 1 or 2.

7. A composition as defined in claim 1 wherein the vinyl-based polymer component of said first stage substrate (a) is comprised primarily of polymerized alkenyl aromatic units.

8. A composition as defined in claim 7 wherein said vinyl-based polymer component of said first stage substrate (a) comprises polystyrene.

9. A composition as defined in claim 7 wherein said vinyl-based polymer component of said first stage substrate (a) is comprised primarily of divinylbenzene units and other alkenyl aromatic units.

10. A composition as defined in claim 8 wherein said vinyl-based polymer component of said first stage substrate (a) comprises styrene/divinylbenzene copolymer.

11. A composition as defined in claim 1 wherein said (meth)acrylate polymer in subsequent stage (b) comprises methyl methacrylate polymer.

12. A composition as defined in claim 1 wherein said vinyl aromatic/(meth)acrylate copolymer in subsequent stage (b) comprises styrene/methyl methacrylate copolymer.

13. A composition as defined in claim 1 wherein said subsequent stages comprise
   (b) (i) a second stage comprising at least one polymer and optionally units derived from a cross-linking agent or agents, units which serve as a graft-linking agent or agents, units derived from a cross-linking agent or agents and units from the same or different agent or agents which serve as a graft-linking agent or agents, or a mixture of any of the foregoing; and
   (b) (ii) a third stage comprising a (meth)acrylate polymer, a vinyl aromatic/(meth)acrylate copolymer or a vinyl aromatic/vinyl cyanide/(meth)acrylate terpolymer.

14. A composition as defined in claim 13 wherein the ratio of first stage substrate polymer (a) to second stage polymer (b) (i) is 10:90 to 90:10 by weight based upon 100 parts by weight of (a) and (b) (i) combined and the amount of third stage polymer (b) (ii) comprises from about 10 to about 90 parts by weight per 100 parts by weight of (a), (b) (i), and (b) (ii) combined.

15. A composition as defined in claim 14 wherein subsequent stage (b) (i) comprises poly(butyl acrylate) or polystyrene.

* * * * *